…

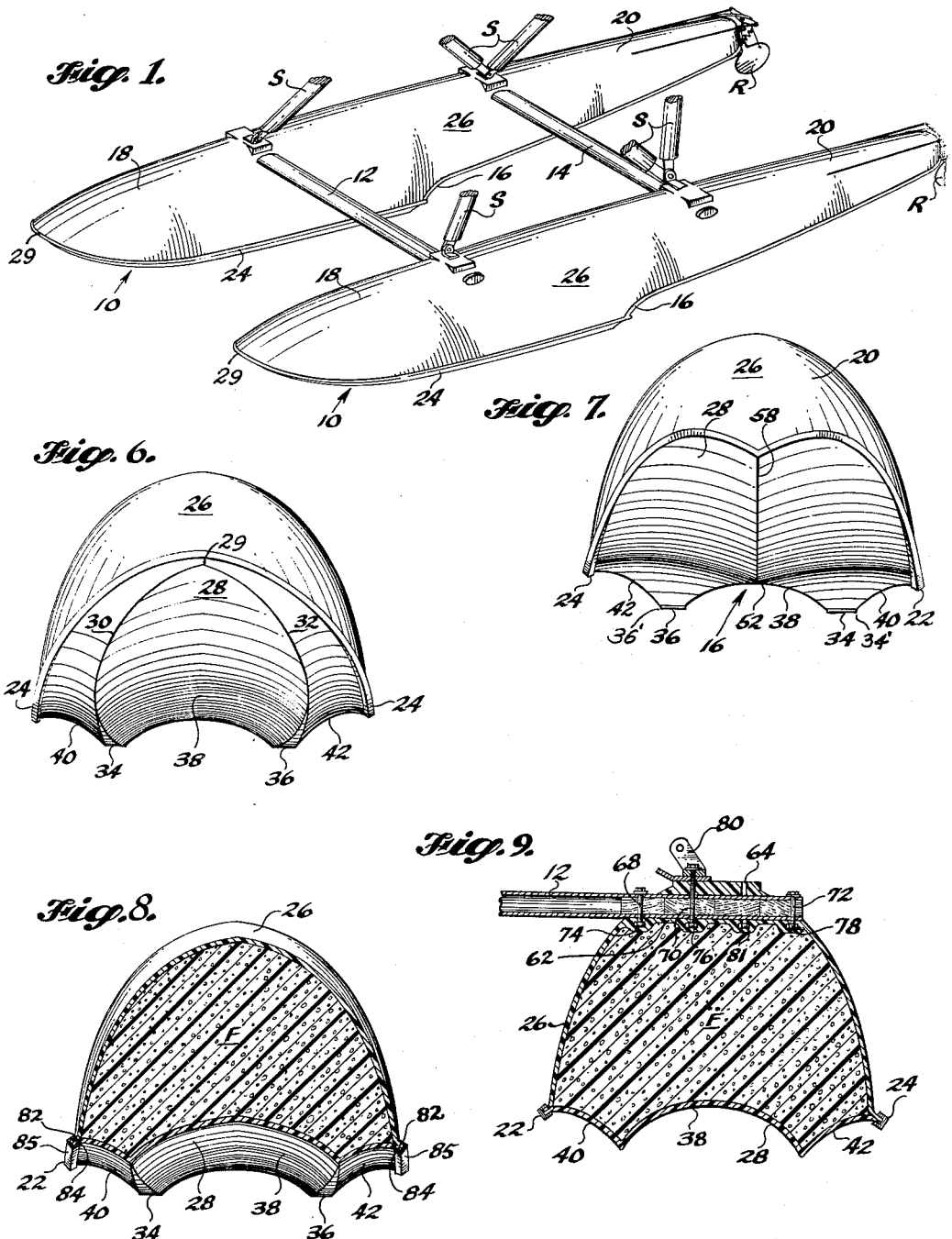

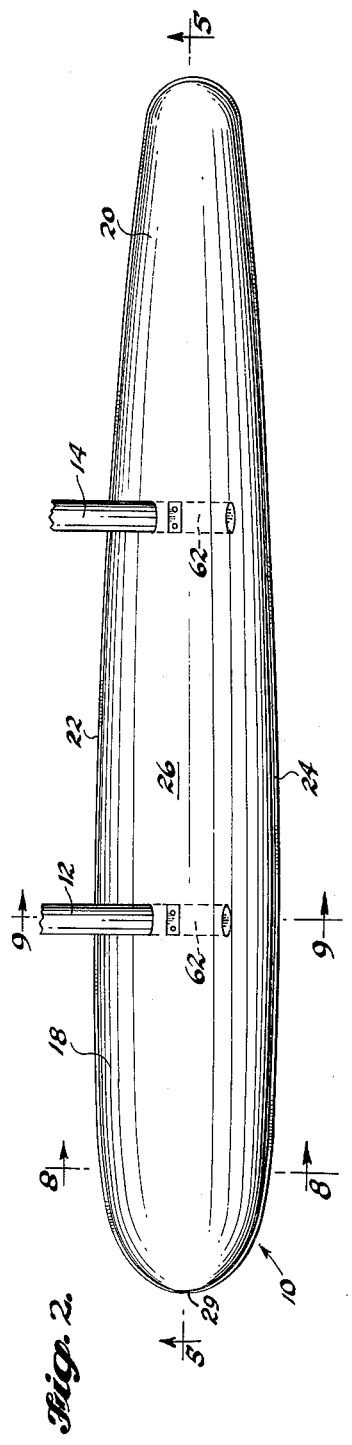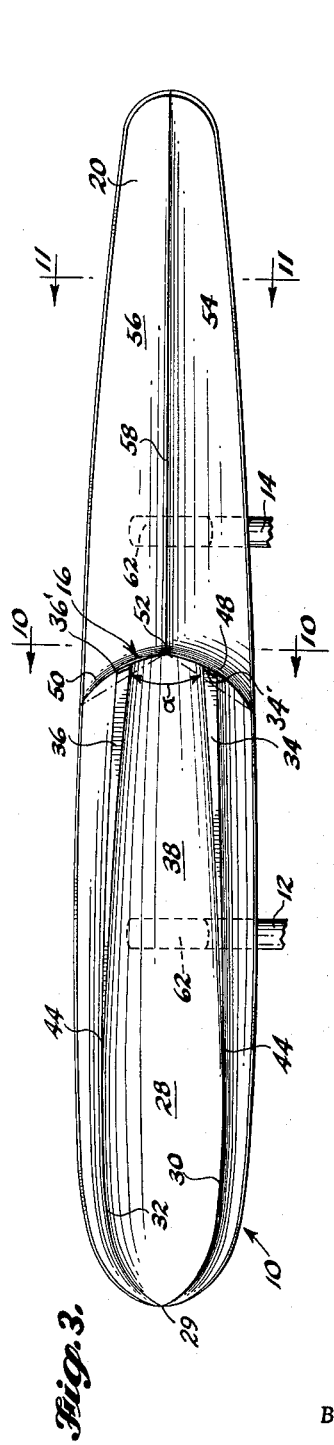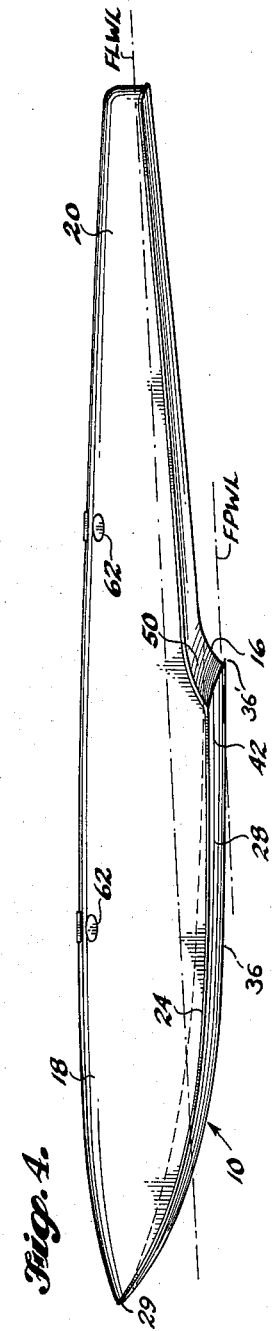
INVENTORS,
WESLEY K. LANDES
ALBERT F. JOHNSON
BY
ATTORNEYS Sept. 28, 1965 W. K. LANDES ETAL 3,208,421
AIRCRAFT FLOATS
Filed Aug. 20, 1963 3 Sheets-Sheet 3
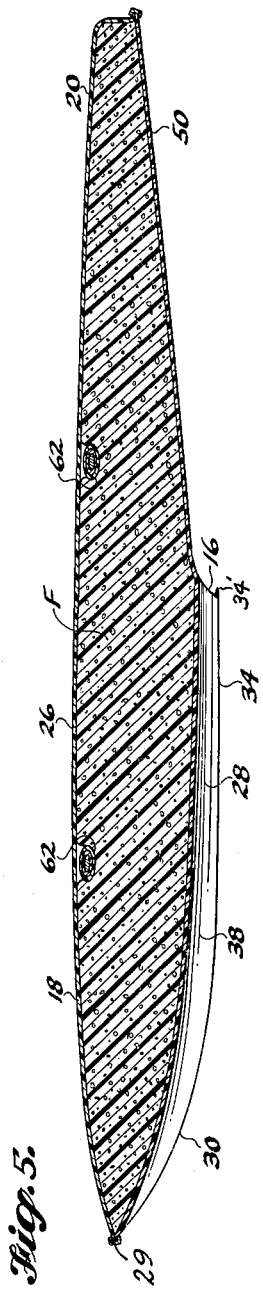
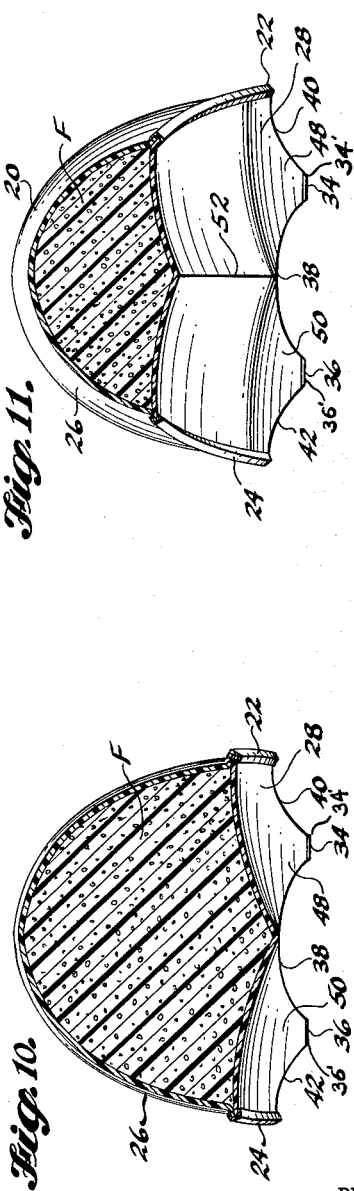
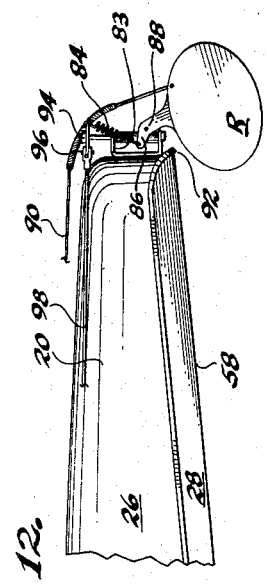
INVENTORS,
WESLEY K. LANDES
ALBERT F. JOHNSON
BY
*Mattus & Graybeal*
ATTORNEYS

United States Patent Office 3,208,421
Patented Sept. 28, 1965

3,208,421
AIRCRAFT FLOATS
Wesley K. Landes, P.O. Box 1254, and Albert F. Johnson, 2509 Blueberry Lane, Anchorage, Alaska
Filed Aug. 20, 1963, Ser. No. 303,345
12 Claims. (Cl. 114—66.5)

The present invention relates to improvements in aircraft floats or pontoons, and more particularly to improvements in frontal and bottom characteristics of single step type floats, to an improved step construction for such floats, and to an improved structural form of float characterized by a foam filled, glass fiber reinforced plastic shell.

This invention is primarily addressed to improvements in single step floats of the type commonly used in pairs to provide a seaplane landing gear. However, certain aspects of the invention also relate to fabrication of a float body or the like of any configuration, wherein the float body is comprised of a glass fiber reinforced plastic shell, structurally augmented by a foam type filler material formed in situ within said shell.

In general, the bottom configuration of a single step type float involves a single keel bow part, separated from a smaller tail part by a more or less abrupt break or "step." Typical of this type of seaplane float are the floats disclosed in Dornier U.S. Pat. No. 1,551,983, Hone U.S. Pat. No. 1,812,265, and Kikuhara U.S. Pat. No. 2,919,669, for example.

In this type of float the bow part curves upwardly in the forward direction so as to give the float an angle of attack relative to its direction of travel. A principal object of the present invention is to provide a float of this general type that is symmetrically constructed about a longitudinally extending, vertical plane of symmetry, wherein the bow part of such float includes a pair of prows originating approximately at the nose of the float and extending rearwardly on opposite sides of said plane of symmetry, and ultimately merging into or becoming a pair of laterally spaced keels. Between the prows and keels the bottom surface of the bow part is concavely curved laterally and forms a main or central channel, extending lengthwise of the bow part. Similiarly, curved bottom surfaces or channels hereinafter termed "secondary" channels, extend lengthwise of the bow part, outboard of the main channel, and between the chines of the float and the prows and keels.

In at least some floats according to the invention, such main and secondary channels are relatively shallow and the crowns thereof are situated substantially in the same horizontal plane; the secondary channels are substantially narrower than the main channel and are laterally inclined somewhat whereas, laterally considered, the main channel extends substantially horizontally, and the main channel converges slightly in the rearward direction. Also, the bow part has a relatively broad base and the upper section thereof (i.e. the portion above the chines) is relatively deep compared to the channels, and it possesses what may be termed "rounded arch" cross-sectional configuration.

In contrast to most conventional single step float configurations, wherein the step consists of a straight transverse wall interconnecting between the bottoms of the bow and tail parts, and a straight ledge formed by the intersection of the bottom of said bow part with said wall, the step configuration according to the present invention slopes both rearwardly and inwardly. Commencing at an apex located in the plane of symmetry, the ledge and the step wall diverge forwardly, preferably in curved fashion so as to form a step configuration appearing as a rounded arch when viewed in bottom plan.

When an aircraft equipped with floats according to the invention is "floating" or being "taxied," the floats set back on the tail part and the bow part is somewhat forwardly inclined. As the aircraft is accelerated to "planing" attitude, water and air are substantially confined by the central main and secondary side channels and the floats are dynamically lifted up onto their twin keels, with the lifting at the step being augmented somewhat by the effect of the rearward convergence of the main channel on the fluid stream. During "full planing" the floats are riding substantially on the keels alone with the tail part completely out of the water.

My unique float design, with its twin keel, centrally channeled bow and arch-shaped step features, achieves the following operational advantages, as compared with known conventional floats:

(1) Shallower draft and less frontal resistance, making possible faster travel on the water with a given amount of propulsive thrust.

(2) Greater "lift" is attained when planing on the water, in view of the convergent channelling of air and water under the central channel of the float bow.

(3) When planing with the floats riding on the twin keels, there is less surface contact of the floats with the water than when planing on a single keel, hence there is less water resistance due to friction.

(4) Owing to the construction and lesser draft of the bow part, the floats are automatically level when running in the water, shocks are more cushioned, and the aircraft and floats are in general more stable.

(5) Owing to the rearward convergence of the step-forming surfaces, water and air flow from the sides of the float into the region rearwardly of the step relieves the suction drag cam normally encountered at such location. This substantially eliminates any drag producing turbulence at the step, allowing the float to move forwardly more easily in the water and rise more readily from the water.

(6) By virtue of being relatively wide and having aerodynamically clean lines, the float produces some positive aerodynamic lift when becoming and while airborne, contributing enough lift to substantially support its own weight and augmenting the wing lift of the aircraft, so as to be more "airworthy."

(7) Floats constructed according to the invention improve the maneuverability of the aircraft, both while on the water and when airborne. Concerning maneuverability in the water more specifically, owing to the bottom construction of the bow part, the water in front of the rudder is less disturbed, making rudder action more positive.

Another principal object and feature of the present invention is to provide a structurally improved aircraft float, such float comprising a shell or casing fabricated from high strength, lightweight synthetic material such as hardenable synthetic resin, such as an epoxy type resin, laminantly impregnated with glass cloth or glass fibers, with an interior filling formed in situ of closed cell cellular material, such as polyurethane foam, or the like. The filler foam constitutes a structural body for the float and to a considerable extent supports the shell against compressive strains, denting, or local deformation, and at the same time is quite light and buoyant. In addition, the filler foam renders the float virtually unsinkable, since the individual cells of the filler foam remain intact and provide buoyancy regardless of the number or placement of punctures or tears which might accidentally occur in the shell. This construction is a vast improvement over conventional hollow metal floats comprising a body of metal panels secured together by rivets, each of which is a potential leak spot and a threat to the buoyancy of the float. The absence of rivets or other shell piercements in the improved float form according to the invention also contributes to its airworthiness in that the unbroken surfaces of the float render it more aerodynamically clean since each rivet or the like on the surface of a conventional metal float can be a source of local turbulence.

These and other features, advantages, objects and capabilities of the present invention will be apparent from the following description of a typical form thereof, as adapted for use on a small aircraft such as the Cessna 180 for example, taken together with the accompanying illustrations, wherein like numerals refer to like parts, and wherein:

FIG. 1 is a perspective view, somewhat fragmented, of a float assembly comprising a pair of floats constructed in accordance with the present invention;

FIG. 2 is an enlarged scale top plan view of the port float of the assembly shown in FIG. 1, prior to installation of the rudder;

FIG. 3 is a bottom plan view of said port float;

FIG. 4 is a side elevational view of the port float, looking towards the port side thereof;

FIG. 5 is a longitudinal sectional view of the port float at the vertical plane of symmetry, such view being taken substantially along line 5—5 of FIG. 2;

FIG. 6 is a nose end elevational view of the port float;

FIG. 7 is a stern end elevational view of the port float;

FIGS. 8–11 present successive cross-sectional views of the port float, with FIG. 8 being taken substantially along line 8—8 of FIG. 2; with FIG. 9 being taken substantially along line 9—9 of FIG. 2; with FIG. 10 being taken substantially along line 10—10 of FIG. 3; and with FIG. 11 being taken substantially along line 11—11 of FIG. 3; and FIG. 12 is a fragmentary side elevational view of the stern end portion of the port float, such view further illustrating the rudder mechanism attached to the stern.

Referring more specifically to the several figures of the drawings, FIG. 1 shows a pair of floats 10 interconnected by fore and after spreader bars 12, 14, respectively, so as to form an assembly suitable for use with a small aircraft, such as the Cessna 180, for example. The float assembly is attached to the aircraft (not shown) by an appropriate number and arrangement of struts S, which are conventional per se.

As shown in FIGS. 2–4, for example, longitudinally considered, the float 10 is divided by a step 16 into a forward or bow part 18 and a rearward or tail part 20. Vertically considered, a pair of chines 22, 24, extending fore and aft on opposite sides of the float 10, divide such float 10 into upper and lower sections 26, 28, respectively.

As best shown in FIGS. 6–11, upper section 26 has a smoothly contoured, generally parabolical configuration in lateral cross-section over the full length of the float 10, but decreases gradually in size towards the ends of said float 10. The lower section 28, constituting the bottom of the float 10, possesses a different cross-sectional configuration in each of its longitudinal parts, as will presently be described.

Referring to FIGS. 4 and 5, the bottom of bow part 18 curves upwardly from the step 16 to the nose 29, giving such bow part 18 and consequently the float 10 an angle of attack. The bow part 18 presents twin prows 30, 32, originating at a common point substantially at the nose 29 and curving both outwardly and rearwardly in symmetrical fashion, on opposite sides of the vertical plane of symmetry. At intermediate locations on the bottom of the bow part 18, the prows 30, 32 become or merge into laterally spaced twin keels 34, 36.

Between the prows 30, 32 and the keels 34, 36, the bottom surface of the bow part 18 is laterally concave and forms what is hereinafter referred to as the main or central channel 38. Secondary or side channels 40, 42, also formed by laterally concave bottom surfaces, extend longitudinally of the bow part 18, outboard of the prows 30, 32 and keels 34, 36, and inboard of the chines 22, 24. The lateral curvature of said channels 38, 40, 42 can perhaps best be described as being cross-sectionally in the nature of relatively shallow elliptical arcs.

The upper section 26 is considerably deeper than the lower section 28 (the depth of the lower section being measured from the chines 22, 24 down to the bottom surfaces of the keels 34, 36). By way if typical example, in the float embodiment illustrated in the drawings, the ratio of the depth of the upper and lower sections 26, 28, respectively, is in the order of five and one-half to one. Measured both between the chines 22, 24 and at the full load water line (FIG. 4) the bow part 18 has a relatively wide base.

As is obvious from the drawings, at the prows 30, 32, single salient angles are formed by the intersection of the inner marginal surface portions of the secondary channels 40, 42 with the outer marginal surface portions of the main channel 38. In the region of the keels, a pair of salient angles are formed by the intersection of the marginal surface portion of the main and secondary channels 38 and 40, 42, respectively, with the flat bottom surfaces of the keels 34, 36, such salient angles forming the respective outboard edges of the keels 34, 36, and the inner pair also forming the side edges of the main channel 38. Both the inboard and outboard edges of keels 34, 36 converge slightly in the rearward direction, with the inboard edges converging to a slightly greater extent, resulting in the keels 34, 36 being triangular in shape, widening rearwardly from a generally pointed toe 44 to a relatively narrow rear edge at the step 16. Also, owing to this arrangement, the main channel 38 substantially converges in its rearward course.

The step 16 comprises a pair of step surfaces 48, 50, of compound curvature, disposed on opposite sides of the plane of symmetry and interconnecting the bottom of the bow part 18 with the bottom of the tail part 20. As shown in FIG. 3, the step surfaces 48, 50 originate at a rearwardly directed apex 52, situated in the plane of symmetry, and then curve in symmetrical fashion both forwardly from said apex 52 and outwardly from said plane of symmetry. The intersection of the step forming surfaces 50, 52 with the several bottom surfaces of bow part 18 is relatively abrupt, forming a ledge, while along their trailing edges the said step forming surfaces 48, 50 gently merge or blend into the bottom panels 54, 56 of the tail part 20 (FIG. 5, for example). In plan, step 16 has what may be termed a slightly rounded V or arch configuration. The angle $\alpha$ between the respective chords of the two arcuate curves representing the outline of the step is relatively flat and preferably falls within the range of about one hundred degrees to one hundred and forty degrees (100°–140°). This construction of the step 16 permits the flow of water and air from the sides of the float 10 into the region behind the step for relieving the suction and substantially obviating the undesirable drag and turbulence that would otherwise exist in such region.

Tail part 20 inclines rearwardly from the step 16 to the stern (FIGS. 2, 10 and 11), and preferably has a hollow V-type bottom, consisting of a pair of laterally concave panels 54, 56, meeting at an apex line 58 situated in the plane of symmetry.

The trim of the float 10 during "floating" or "taxiing" of the aircraft is substantially indicated by the slope of the full load water line WL (note FIG. 4). During takeoff, as the float 10 moves through the water the twin prows 30, 32 displace water inwardly into the main or central channel 38, and outwardly into the secondary channels 40, 42. The dynamic reaction of the water and air flow deflected downwardly by the forwardly inclined frontal areas 4 the channels 38, 40, 42 produces an initial lifting force on the bow part 18 tending to raise it in the water and steepen the trim. However, the entrapped water and air flowing through the main channel 38 and secondary channels 40, 42 exerts additional lifting forces on the bottom of the float 10 rearwardly of the frontal areas and tends to level out the trim. During relatively low speeds, the water flowing under said channels 38, 40, 42 follows the bottom at the step 16 and in the tail part 20. As the speed of the aircraft increases, the float 10 rides higher in the water, with the water and air stream now flowing over the step 16 as an inverted waterfall and making contact with the bottom surfaces of the tail section 20. As the speed of travel is increased, the point of contact moves aft, because the fluid velocity or speed of flow over the step increases proportionately, and ultimately the flow clears the bottom when full planing is attained (cf. full planing water line FPWL in FIG. 4). The narrowing of the main channel 38 causes an increase in the fluid velocity immediately ahead of the step and creates additional lift of the float 10 at such location.

During the latter stages or rising, and during planing, more air and less water is entrapped by the channels 38, 40, 42, and float 10 rides primarily on a channeled cushion of air alone duing full planing, with essentially only the keels 34, 36 riding in the water.

Up to and including the full planing stage the rise of the floats 10 and the aircraft is due substantially entirely to lift created by the floats 10, with wing lift being more or less negligible. When takeoff speed is reached, the floats 10 are substantially riding only on their keels 34, 36, and there is a minimum resistance to the removal of such floats 10 from the water by wing lift due to friction and the suction effect.

The float 10 is constructed essentially entirely of non-metallic, non-corrosive, synthetic materials and is composed of a shell or casing formed of integrally interbonded upper and lower sections and essentially completely filled with a closed cell cellular material, such as polyurethane foam or the like, hereinafter referred to as the fill or filling F. The shell is longitudinally divided into complementary upper and lower shell sections, meeting at the chines 22, 24, and corresponding to the upper and lower sections 26, 28, respectively, of the float 10. Throughout this discussion, the reference characters 26, 28, used to designate the portions of the float 10 above and below the chines 22, 24, will also be used for designating the respective upper and lower shell sections.

According to the invention, the upper and lower shell sections 26, 28 are each of one piece construction and are fabricated from a hardenable synthetic resin (e.g. a polymerizable unsaturated polyester-type resin) reinforced by woven glass fibers, more commonly termed Fiberglas reinforced plastic. Preferably, the upper and lower shell sections 26, 28 are fabricated in depression-type molds, not shown (the configuration of such molds being considered apparent from the illustrated configurations of such shell sections), by successive build-up of an appropriate number of layers of the hardened synthetic resin and woven glass cloth or glass fibers. The fabrication technique for the upper and lower shell sections, and the manner of interbonding the sections together to make an integral or one-piece shell are similar to the techniques disclosed in my U.S. Pat. No. 2,950,883 for fabrication of aircraft skis, and reference should be made to said patent for a fuller disclosure of appropriate fabrication details.

Preferably the keels 34, 36, or at least the trailing edges thereof, are capped by a thin stainless steel wear plate that is bolted to or embeddedly bonded into the resin material. For purposes of illustration in this respect, knife edge stern placed keel plates on the keels 34, 36 are indicated at 34' and 36' in FIGS. 3, 4, 5, 7, 10 and 11. The knife edge keel plates 34', 36', in addition to protection of the keels from wear, also serve to provide a sharp separation point for water off the keels and thus provide a smaller wake and a smoother transition between planing state and airborne state during takeoff.

At the anchorage locations for the spreader bars 12, 14, the hardenable synthetic resin and woven glass fibers are molded around a transverse bar or rod of polished metal or the like, to which the resin does not adhere. The bars are moved after curing of the resin, leaving transverse sockets which serve as receptors for the ends of the spreader bars, one of such sockets being illustrated in FIG. 9 and designated 62 therein. The spreader bars 12, 14 are preferably constructed from aluminum tubular material. Plugs of wood or the like (note FIG. 9), conforming to the interior configuration of the hollow interior of the spreader bars 12, 14, are inserted into the end portions of such spreader bars, and a plurality of bolts 68, 70, 72 extend through openings drilled in said spreader bar end portions and in the plugs and screw into interiorly threaded receptacles 74, 76, 78, respectively, which are embedded in the glass fiber reinforced plastic at the bottom of socket 62 during the formation of the same.

Bolt 70 extends through the top surface of the upper shell section 26, which is reinforced in the regions of sockets 62, and also serves to secure a fitting 80 onto the float 10, such fittings 80 serving as anchorage means for the struts S, with the lower ends of the struts S being bolted or otherwise secured thereto. An additional opening 64 for the bolt 70 may be provided through said reinforced portion of the top surface on the opposite side of the plane of symmetry, and an additional interiorly threaded receptacle 81 located at its bottom, so as to make the float 10 usable on either side of the aircraft.

Except for the placement of the fittings 80 (again note FIG. 9), each of the port and starboard floats 10 is identical to the other, and identically fabricated.

The marginal portion of shell sections 26, 28 are formed into lips or flanges 82, 84 (FIG. 8) at which the said shell sections 26, 28 are bonded together. After the shell has been assembled, the filling F, in a liquid form, is injected through suitable openings in the shell (e.g. such openings may be located in an internal well portion of the socket 62 near end portions thereof) into the hollow interior of the shell. Owing to its chemical nature, such material quickly expands, either with or without the application of external heat, and completely fills the entire interior of the shell, after which it sets up into a cellular but essentially rigid foam filling F. Such filling F supports the shell against compressive strains and denting or local deformation. The resulting float structure as a whole possesses great strength and rigidity while at the same time is lightweight and buoyant. Owing to the fact that the bottom of float 10 is backed up and structurally supported by the filling F over the full extent of its surface area, the bottom of the float is better adapted to withstand the severe forces to which it is subjected during takeoffs and landings than are conventional floats, wherein the bottom material is supported at spaced locations by an interior framework of structural members. A further advantage of the unicellular plastic foam filling is that it renders the float 10 vertually unsinkable, with the bulk of the individual cells of the foam remaining intact and providing bouyancy regardless of the number or placement of punctures or tears which might accidentally be formed in the shell.

The flanges 82, 84 are preferably covered by a cap strip 85 of aluminum or stainless steel. The float 10 may also carry a rudder R, as shown in FIG. 12, which is pivotally mounted both horizontally and vertically on a supporting bracket 83. A spring 84 normally holds the rudder R in the water by biasing upwardly the upper end portion 86 of rudder R, such end portion 86 extending slightly above and to one side of the vertical pivot point 88. A control cable 90 leading from the aircraft connects to the rudder R below the pivot point 88 and serves as a means for opposing the force of spring 84 and lifting the rudder R from the water when it is desired to do so. The means forming pivot point 88 are located on a cylindrical sleeve 92 which in turn surrounds a rod 94 attached at its upper end to a tilter bar 96 that is controlled from the aircraft by a control cable 98. During fabrication of the upper shell section 26 the stern end thereof is reinforced by the successive build-up of additional layers of the resin and glass fiber, and anchorage means (not shown) for the bracket 83 may be embedded into such material at the stern.

In the accompanying drawings the float shown is drawn substantially to scale and illustrate a float expressly designed for use on a Cessna 180 aircraft. This float has a length of 18.5 feet, a width of 33 inches, a depth of 27 inches, a shell weight of 90 lbs., and an interior volume of 46 cu. ft., in which the filler foam is polyurethane of a density of about 1¼ lbs./cu. ft. The displacement rating of each such float is 2800 lbs., and the final weight of the complete landing gear as shown in FIG. 1 is 360 lbs.

From the foregoing consideration of various aspects of the invention, other arrangements, adaptations and modifications of the invention will occur to those skilled in the art to which the invention is addressed and are to be considered to be within the scope of the invention as defined by the following claims.

What is claimed is:

1. In an aircraft float, a step extending across the float, a bow extending forwardly of said step and having a bottom composed of a pair of keels spaced laterally outboard on opposite sides of a longitudinal center line, a laterally concave channel extending between said keels and throughout the length of said bow, and a bottom surface extending outboardly of each said keel.

2. In a longitudinally stepped aircraft float, a bow according to claim 1, wherein the said channel narrows rearwardly.

3. An aircraft float according to claim 1, wherein the said step converges rearwardly, as viewed in bottom plan.

4. An aircraft float comprising a step extending across the float, a bow extending forwardly of said step, and a tail extending rearwardly of the step, said bow inclining forwardly and presenting a pair of laterally spaced prows separated by a laterally concave surface, with a keel extending rearwardly from each prow, with said laterally concave surface extending rearwardly from its position between the prows and becoming a channel situated between the keels, said float further comprising laterally concave surfaces situated outboardly of the prows and also extending rearwardly and forming secondary channels located outboardly of the keels, and each of said channels terminating at said step.

5. An aircraft float comprising a shell of glass fiber reinforced plastic material substantially completely filled with a buoyant, closed-cell, cellular material, said float having a step extending across the float, a bow extending forwardly of said step, and a tail extending rearwardly of said step, said bow presenting twin prows, twin keels extending rearwardly from said prows, and a channel extending lengthwise of the bow between the prows and the keels and being of a laterally concave configuration, said channel terminating at said step.

6. An aircraft float in accordance with claim 5, wherein the said keels are of a triangular configuration, widening from front to rear.

7. An aircraft float according to claim 6, wherein the said channel narrows rearwardly.

8. An elongated aircraft float having a pair of chines extending lengthwise along its opposite sides, and dividing it into upper and lower portions, and having a transverse step dividing it into bow and tail parts, said upper portion having a generally parabolical transverse surface configuration extending substantially the full length of the float, but decreasing in size towards the ends of said float, and said bow part of the lower portion having a bottom formed by a pair of laterally spaced prows and a pair of laterally spaced keels extending rearwardly of and constituting rearward extensions of said prows, a main channel situated between said prows and keels, and secondary channels interconnecting between the prows and keels and the chines, with each of said channels presenting a laterally concave bottom surface, and with said main and secondary channels terminating at said step.

9. An aircraft float according to claim 8, wherein the depth of said upper portion, measured from its top down to the chines, is at least about five times the depth of the lower portion, measured between the chines and the bottom of the keels.

10. An aircraft float according to claim 8, wherein said bow part inclines forwardly from the step along its bottom and declines forwardly along its top, and said tail section has a bottom surface that inclines rearwardly from the step and is divided by a longitudinally extending centerline apex, offset below the chines, into two bottom surface parts, each of which extends laterally from said apex upwardly to a chine.

11. An aircraft float according to claim 10, wherein said bottom surface parts of the tail section are of concavely curved configuration laterally considered.

12. An elongated aircraft float having a pair of chines extending lengthwise along its opposite sides, and dividing it into upper and lower portions, and having a transverse step dividing it into bow and tail parts, said bow part of the lower portion having a bottom formed by a pair of laterally spaced prows and a pair of laterally spaced keels extending rearwardly of and constituting rearward extensions of said prows, a main channel situated between said prows and keels, and secondary channels interconnecting between the prows and keels and the chines, with each of said channels presenting a laterally concave bottom surface, and with said main and secondary channels terminating at said step.

References Cited by the Examiner

UNITED STATES PATENTS

| | | | |
|---|---|---|---|
| 2,422,818 | 6/47 | Bamberger | 114—66.5 |
| 2,423,796 | 7/47 | Platt | 114—62 |
| 2,909,791 | 10/59 | Malary | 114—66.5 |
| 2,998,798 | 9/61 | Love | 9—6 |
| 3,007,208 | 11/61 | Urban | 9—6 |
| 3,051,115 | 8/62 | Canazzi | 114—56 |
| 3,078,202 | 2/63 | Bellanca | 9—6 |
| 3,090,339 | 5/63 | Carr | 114—61 |

FOREIGN PATENTS 362,691  12/31  Great Britain.

FERGUS S. MIDDLETON, *Primary Examiner.*